United States Patent
Ponting

[15] 3,678,780
[45] July 25, 1972

[54] CAM ASSEMBLY

[72] Inventor: Ivor Ponting, Essex, England

[73] Assignee: Electrical Remote Control Company Limited, Essex, England

[22] Filed: Aug. 26, 1970

[21] Appl. No.: 67,097

[30] Foreign Application Priority Data

Aug. 24, 1969   Great Britain ..................... 42,754/69

[52] U.S. Cl. .......................... 74/568 R, 74/530, 74/577 SF, 74/568 T, 200/38 BA
[51] Int. Cl. ......................................................... F16h 53/00
[58] Field of Search ............ 74/568 R, 568 T, 568 M, 577 M, 74/577 SF, 577 S, 577 R, 578, 530; 200/38 BA, 38 CA

[56] References Cited

UNITED STATES PATENTS

| 3,285,094 | 11/1966 | Aschwanden | 74/568 |
| 2,545,719 | 3/1951 | Wedeberg | 75/568 T |

Primary Examiner—William F. O'Dea
Assistant Examiner—F. D. Shoemaker
Attorney—Waters, Roditi, Schwartz & Nissen

[57] ABSTRACT

A cam assembly includes a generally cylindrical central body formed with an external ring of teeth and encircled by two identical annular members each having two inwardly directed pawls resiliently engaging the teeth at circumferentially spaced locations. The annular members have profiled outer peripheral control surfaces for co-operating with a cam follower extending across both surfaces. To adjust the overall control surface, the annular members are manually turned about the body axis, the pawls riding over the teeth, and then the annular members are clamped to the body, while the pawls hold the annular members in position.

8 Claims, 2 Drawing Figures

Patented July 25, 1972 3,678,780

CAM ASSEMBLY

BACKGROUND OF THE INVENTION

1. Field of the Invention

This invention relates to a cam assembly, particularly for a timer.

2. Description of the Prior Art

A known timer includes a cam shaft which is driven through reduction gearing by an electric motor. Mounted on the cam shaft are a plurality of disc cam assemblies which operate respective control devices, for example electric switches, through roller-type cam followers. Each cam assembly comprises two discs arranged face-to-face on the shaft and fixed to respective bushes which are fastened by set screws to the shaft. The discs of each assembly have respective profiled control surfaces at their outer peripheries, and the associated cam follower extends across both such surfaces of the assembly. The shape of the overall control surface presented to this follower by the assembly can be adjusted by adjusting one of the two discs about the cam shaft relatively to the other, while the angular position of the overall control surface can be adjusted by adjusting both discs about the shaft. Such adjustment is relatively time-consuming and requires some skill particularly because a disc is easily knocked out of a selected position unless the associated set screw is tightened, and, furthermore, a screw-driver is required to rotate the set screws.

SUMMARY OF THE INVENTION

According to the present invention, there is provided a cam assembly comprising a generally cylindrical central body for rotation about an axis, an annular member encircling said body and said axis and mounted on said body for rotation therewith about said axis, said member having a profiled control surface for co-operating with a cam follower, and ratchet-and-pawl means provided on said body and said member to hold said member adjustably in a selected angular position about said axis relative to said body.

This invention has the advantage that adjustment of the cam assembly can be performed rapidly and by a relatively unskilled person, because the ratchet-and-pawl means can lightly hold the annular member in a selected angular position relatively to the body.

BRIEF DESCRIPTION OF THE DRAWING

In order that the invention may be clearly understood and readily carried into effect, reference will now be made, by way of example, to the accompanying drawing, in which.

DESCRIPTION OF THE PREFERRED EMBODIMENT

Figure 1:
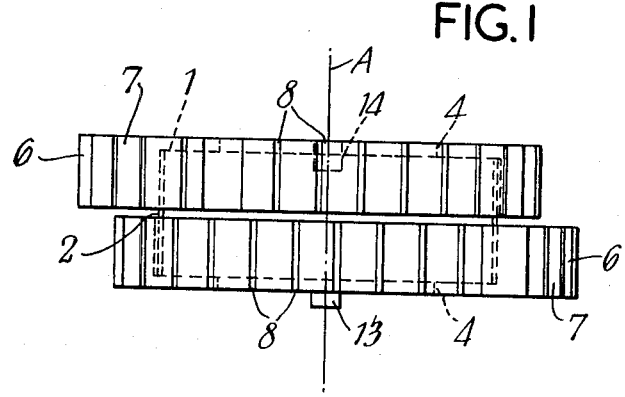
FIG. 1 shows a plan view of a cam assembly for a timer.
Figure 2:
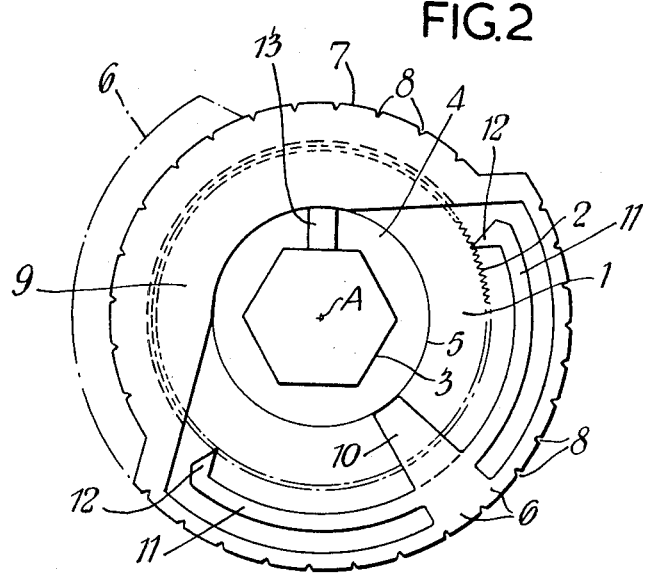
FIG. 2 is an end elevation of the cam assembly, but with one of two annular members of the assembly being shown in broken lines for clarity of illustration.

Referring to the drawing, the assembly includes a generally cylindrical central plastics body 1 for rotation about its own axis A. The outer periphery of the body 1 is formed therearound with a large number of small teeth 2 arranged in a ring and its inner periphery 3 is of hexagonal radial section for fitting over a hexagonal cam-driving shaft of the timer. This shaft consists of a hexagonal alloy extrusion having a stainless steel core. At each axial end, the body 1 includes an axially projecting boss 4 of which the circular outer periphery 5 is located between the peripheries 2 and 3. The assembly also includes two annular resilient plastics members 6 which are identical to each other. Each member 6 encircles the body 1 and the axis A and is mounted on the body for rotation with the body 1 about the axis A. Each member 6 has its outer peripheral surface 7 profiled to act as a control surface. The two control surfaces of the assembly co-operate with a single roller follower (not shown) which operates an electrical or pneumatic micro-switch of the timer. Each control surface 7 is provided with notches 8 to facilitate turning of the member 6 by hand about the axis A relatively to the body 1, and consists of an inner dwell, an outer dwell, and an instroke and an outstroke between the dwells. At one of its axial ends each member 6 is open to receive the body 1, but at the other of its axial ends it is partly closed by an arcuate portion 9 and a finger 10 which bear against that annular end face of the body 1 between the peripheries 2 and 5. The portion 9 and the finger 10 of each member 6 receive between them the adjacent boss 4 and their axially outer surfaces are flush with the axially outer surface of the boss. Radially inwardly of the outer dwell, each member 6 includes two identical arcuate pawls 11 which carry at free ends of resilient arms thereof respective teeth 12 which engage with the teeth 2 at almost diametrically opposite locations on the body 1. Owing to the resilience of the pawls 11, the ratchet-and-pawl arrangement 2, 11, lightly holds its associated annular member 6 in a selected angular position about the axis A relative to the body 1. To adjust each member 6 about the axis A relatively to the body 1, a light torque is manually applied to the member 6 to cause the teeth 12 to ride over the teeth 2. Since the inner and outer dwells of each member 6 are of almost 180°, by adjustment of one of the two members 6 about the axis A relatively to the other, it is possible to obtain an overall control surface having an inner dwell of any selected value between about 0° and 180°.

In practice, a number of assemblies each as shown are mounted in a row on the cam-driving shaft such that an axial projection 13 from one boss 4 of one assembly engages in an axial recess 14 in one boss 4 of the next assembly, and so on. If necessary, the annular members 6 are then adjusted about the axis A. After any such necessary adjustment, the members 6 are then clamped in their selected angular positions relatively to the bodies 1 and the timer shaft by means of a nut which is carried on a threaded end of the timer shaft and is tightened against one end of the row of assemblies with the interposition of a washer.

I claim:

1. A cam assembly comprising a generally cylindrical central body for rotation about an axis, an annular member encircling said body and said axis, said member having a profiled control surface for co-operating with a cam follower, and ratchet-and-pawl means provided on said body and said member to hold said member adjustably in a selected angular position about said axis relative to said body, said ratchet-and-pawl means comprising a ring of teeth provided on the outer periphery of said body and encircling said axis, and an inwardly directed pawl resiliently carried by said annular member and selectively engaging said teeth.

2. A cam assembly according to claim 1, wherein said pawl comprises a tooth and a resilient arm extending arcuately around said outer periphery and connecting said tooth to said annular member.

3. A cam assembly according to claim 1, wherein said ratchet-and-pawl means further comprises a second inwardly directed pawl resiliently carried by said annular member and selectively engaging said teeth, the two pawls engaging said teeth at respective first and second locations spaced apart around the outer periphery of said body.

4. A cam assembly according to claim 1, and further comprising another annular member encircling said body and said axis and mounted on said body for rotation therewith about said axis, said other annular member having another profiled control surface for co-operating with said cam follower, and another inwardly directed pawl resiliently carried by said other member and selectively engaging said teeth to hold said other member adjustably in a selected angular position about said axis relatively to said body.

5. A cam assembly according to claim 4, wherein the profiled control surface of each annular member forms the outer peripheral surface thereof, and the annular members are substantially identical to each other.

6. A cam assembly according to claim 4, wherein each annular member is open at one of its axial ends to receive said body and is partly closed at its other axial end by portions of said annular member bearing against an adjacent axial end face of said body.

7. A cam assembly according to claim 1, and further comprising portions of said body defining in an end face at one axial end of said body a recess for closely receiving a projection provided on an end face at one axial end of a generally cylindrical central body of an adjacent cam assembly, an end face at the other axial end of the first-mentioned body having provided thereon a projection for fitting in a recess formed in an end face at one axial end of a generally cylindrical central body of another adjacent cam assembly.

8. A cam assembly according to claim 1, and further comprising portions of said body defining a central axial hole therethrough of polygonal cross-section for closely receiving co-axially a cam shaft of polygonal cross-section.

* * * * *

UNITED STATES PATENT OFFICE
CERTIFICATE OF CORRECTION

Patent No. 3,678,780        Dated July 25, 1972

Inventor(s) IVOR PONTING

It is certified that error appears in the above-identified patent and that said Letters Patent are hereby corrected as shown below:

On the cover sheet [30] under "Foreign Application Priority Data", "Aug. 24, 1969" should read -- Aug. 27, 1969 --.

Signed and sealed this 19th day of December 1972.

(SEAL)
Attest:

EDWARD M. FLETCHER, JR.        ROBERT GOTTSCHALK
Attesting Officer        Commissioner of Patents